(12) United States Patent
Anderson et al.

(10) Patent No.: US 7,707,239 B2
(45) Date of Patent: Apr. 27, 2010

(54) USING LOCAL NETWORKS FOR LOCATION INFORMATION AND IMAGE TAGGING

(75) Inventors: Eric C. Anderson, Gardnerville, NV (US); Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1138 days.

(21) Appl. No.: 10/978,491

(22) Filed: Nov. 1, 2004

(65) Prior Publication Data

US 2006/0095540 A1    May 4, 2006

(51) Int. Cl.
*G06F 15/16* (2006.01)
*G03B 17/24* (2006.01)

(52) U.S. Cl. .................... 709/202; 709/218; 455/456.1; 348/231.3; 396/281; 396/310

(58) Field of Classification Search ......... 709/201–203, 709/217–219; 455/456.1–457; 348/231.3; 396/281, 310
See application file for complete search history.

(56) References Cited

U.S. PATENT DOCUMENTS

| | | | | |
|---|---|---|---|---|
| 5,929,848 A * | 7/1999 | Albukerk et al. | ............ | 715/700 |
| 5,969,678 A * | 10/1999 | Stewart | ...................... | 342/457 |
| 6,161,131 A * | 12/2000 | Garfinkle | .................... | 709/206 |
| 6,181,878 B1 * | 1/2001 | Honda | ......................... | 396/310 |
| 6,462,778 B1 * | 10/2002 | Abram et al. | ................ | 348/239 |
| 6,507,371 B1 * | 1/2003 | Hashimoto et al. | .......... | 348/552 |
| 6,522,292 B1 | 2/2003 | Ellenby et al. | ......... | 342/357.07 |
| 6,522,889 B1 * | 2/2003 | Aarnio | ..................... | 455/456.5 |
| 6,664,925 B1 * | 12/2003 | Moore et al. | ................. | 342/451 |
| 6,690,883 B2 | 2/2004 | Pelletier | | |
| 6,710,740 B2 * | 3/2004 | Needham | ............... | 342/357.13 |
| 6,914,626 B2 * | 7/2005 | Squibbs | ................... | 348/231.3 |
| 6,987,744 B2 * | 1/2006 | Harrington et al. | .......... | 370/328 |
| 7,007,243 B2 * | 2/2006 | Baldino | ....................... | 715/853 |
| 7,009,643 B2 | 3/2006 | Nakamura et al. | | |
| 7,248,285 B2 * | 7/2007 | Needham | .................. | 348/207.1 |
| 2003/0081126 A1 | 5/2003 | Seaman et al. | | |
| 2004/0004663 A1 * | 1/2004 | Kahn et al. | ............... | 348/207.1 |
| 2004/0047606 A1 | 3/2004 | Mikawa | | |
| 2004/0114042 A1 | 6/2004 | Paolini et al. | | |
| 2004/0126038 A1 | 7/2004 | Aublant et al. | | |
| 2004/0157622 A1 * | 8/2004 | Needham | .................. | 455/456.1 |
| 2004/0183918 A1 * | 9/2004 | Squilla et al. | ............. | 348/211.2 |
| 2005/0093976 A1 | 5/2005 | Valleriano et al. | | |
| 2005/0104976 A1 | 5/2005 | Currans | | |
| 2005/0254505 A1 | 11/2005 | Chang et al. | | |

OTHER PUBLICATIONS

"Need a GPS and a Camera? Why Not All-in-One?" www.geospatialexperts.com/ricoh.html, pp. 1-2 and pp. 1-3.

* cited by examiner

*Primary Examiner*—David Lazaro

(57) ABSTRACT

The present invention provides a method for establishing a location for a digital image without the use of a GPS unit. Aspects of the invention include broadcasting over a network a location identifier (ID) identifying a location of the network; detecting the location ID by a digital image capture device coupled to the network; and in response to the image capture device capturing a digital image when in communication with the network, associating the location ID with the digital image.

26 Claims, 9 Drawing Sheets

USING LOCAL NETWORKS FOR LOCATION INFORMATION AND IMAGE TAGGING

FIELD OF THE INVENTION

The present invention relates to location services for digital images, and more particularly to a method and system for using local area networks for location information and image tagging.

BACKGROUND OF THE INVENTION

Currently, in order to provide location services for a digital camera for the purpose of automating location tag creation for images, the camera must have some location sensors, such as a GPS receiver or cell phone with location detection. A central database can then review the image to determine what tags should be attached at a later time (the GPS or other location codes are stored in the image as tags for retrieval later).

An example of such a system available is the Caplio Pro G3 digital camera by Ricoh that is capable of automatic image geo-coding. A CompactFlash WAAS GPS card plugs into a slot in the camera and captures location data as the user takes pictures and stores the data in the images. Alternatively, a Bluetooth adapter allows the camera to communicate with a Bluetooth GPS unit for capturing the location data. The camera comes equipped with a desktop application called "GPS-Photo Link." Once the geo-coded images are downloaded to the user's desktop, the GPS-Photo Link application creates GPS watermarks for the images. The user may also insert a CompactFlash WiFi 802.11b card into the camera for wireless communication for the purpose of downloading the images from the camera to a PC or PDA via FTP or e-mail.

Another example of a system that associates digital images with a photographer's location is a GPS equipped PDA called coyotEYE by Lupine Logic, Inc. of Missoula, Mont. The CoyotEYE product includes an iPAQ PDA by HP of Palo Alto, Calif., add-on hardware by Nexian, Inc. (theNexiCAM and NexiGPS hardware), and a choice of SyBASE iAnywhere or MS Access database engine.

Although integrating a GPS unit into the camera eliminates the need for the user to carry a separate GPS unit, the use of GPS units with handheld digital image capture devices has several disadvantages, which includes being bulky, expensive, and energy inefficient. For example, FIG. 1 is a diagram illustrating the Ricoh camera 500 with an attached GPS CompactFlash card 502. Also shown is an example image 504 watermarked with the GPS data. As shown, the GPS CompactFlash card 502 inserted into the Ricoh camera 10 extends well outside of the camera housing, which is unwieldy to use. Similarly, the GPS antenna of the coyotEYE PDA extends well past the PDA housing. In addition, the Ricoh camera/GPS/software bundle lists for $1199, with the GPS card 502 contributing $160, and the coyotEYE PDA lists for $849.99. It is unclear how many users, other than hard-core enthusiast, will be willing to pay such a premium to have their images stamped with location data.

In the future, it is expected that the use of GPS units in handheld digital image capture devices will become ubiquitous as advances in hardware make the GPS units smaller, less expensive, and more energy-efficient. In the meantime, however, a need exists for a method and system for establishing the location of digital images that does not suffer the limitations present with today's GPS technology. The present invention addresses such a need.

BRIEF SUMMARY OF THE INVENTION

The present invention provides a method and system for establishing a location for a digital image using local networks, rather than using GPS units. Aspects of the invention include broadcasting over a network a location identifier (ID) identifying a location of the network; detecting the location ID by a digital image capture device coupled to the network; and in response to the image capture device capturing a digital image when in communication with the network, associating the location ID with the digital image.

In a second embodiment of the present invention, the location ID broadcast over the network includes a network ID. After the mobile device captures a digital image while in communication with the network, the network ID is sent to an online location information service, which looks-up the location of the network based on the network ID. The location information is then returned for association with the digital image, preferably as a location tag. In a third aspect of the present invention, not only does the location information service provide the user with general capture location tags, but may also provide a specific description tag describing the contents of the images by matching uploaded captured images to reference images captured within the same network, and using description tags saved with the reference images to automatically tag the uploaded images.

According to the method and system disclosed herein, the present invention provides users of mobile devices with automatic location tagging of images captured by mobile devices without the need and expense of GPS units.

DETAILED DESCRIPTION OF THE INVENTION

The present invention relates to location service for digital images. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

With recent advancements in the integration of GPS and digital imaging, it has been found desirable to add location information to the images as a user travels from place to place taking pictures, as location is one of the strongest memory cues when people are recalling past events. However, as stated above, the use of GPS systems and digital image capture devices has inherent limitations that hinders the widespread adoption of automatic tagging of images with location information.

According to the present invention, rather than using GPS units to geocode digital images to provide location information, the present invention utilizes the availability of many small local area wireless networks as a means of establishing location for digital images. In a first embodiment, wireless networks are configured to broadcast location identifiers (IDs), which may then be detected by mobile devices and associated with any images captured while the mobile device is within detectable range of the wireless network. In the first embodiment, the location ID is text and/or audio tags identifying the geographical location (e.g., Starbucks, Palo Alto, Calif.). In a second embodiment of the present invention, the location ID broadcast by the networks are network IDs. After the mobile device captures a digital image while in communication with the network, the network ID is sent to an online location service, which looks-up the location of the network based on the network ID. The location information is then returned for association with the digital image, preferably as a location tag.

Figure 1:
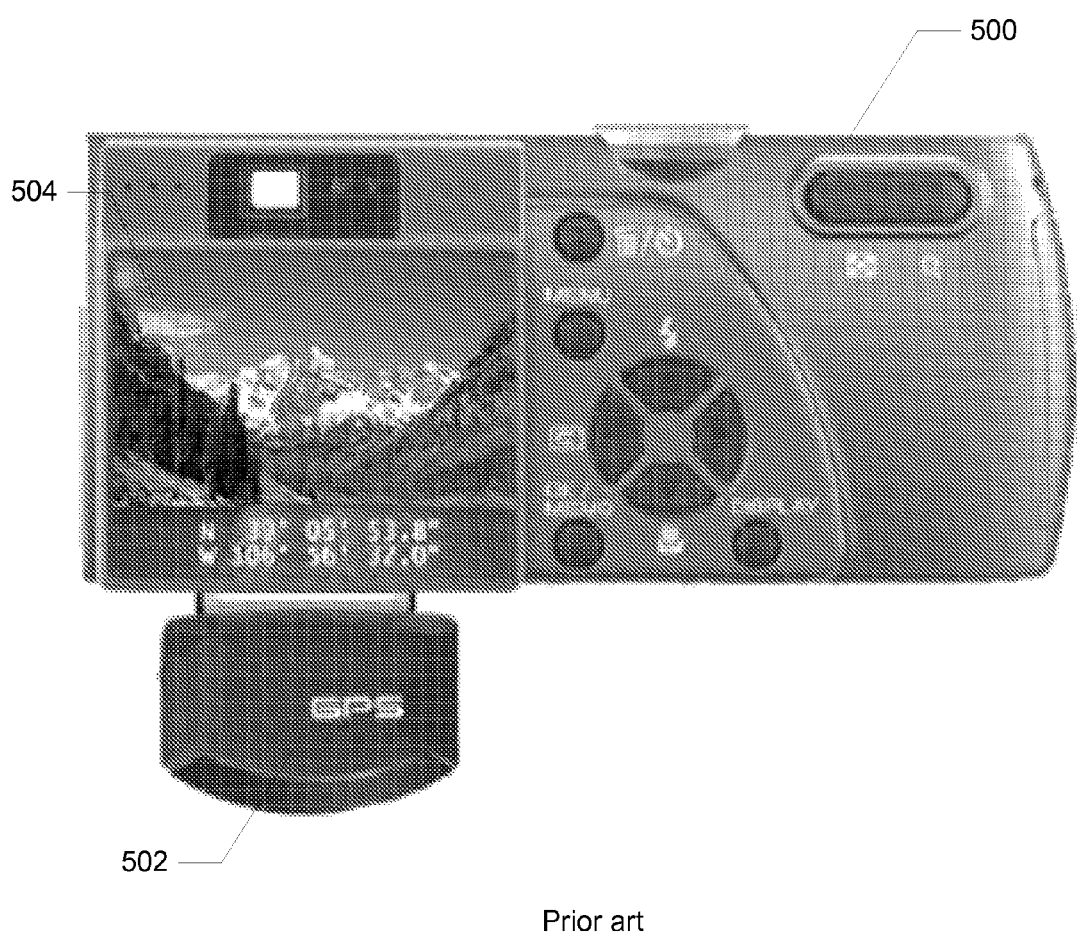
FIG. 1 is a diagram illustrating a conventional Ricoh camera with an attached GPS CompactFlash card.
Figure 2:
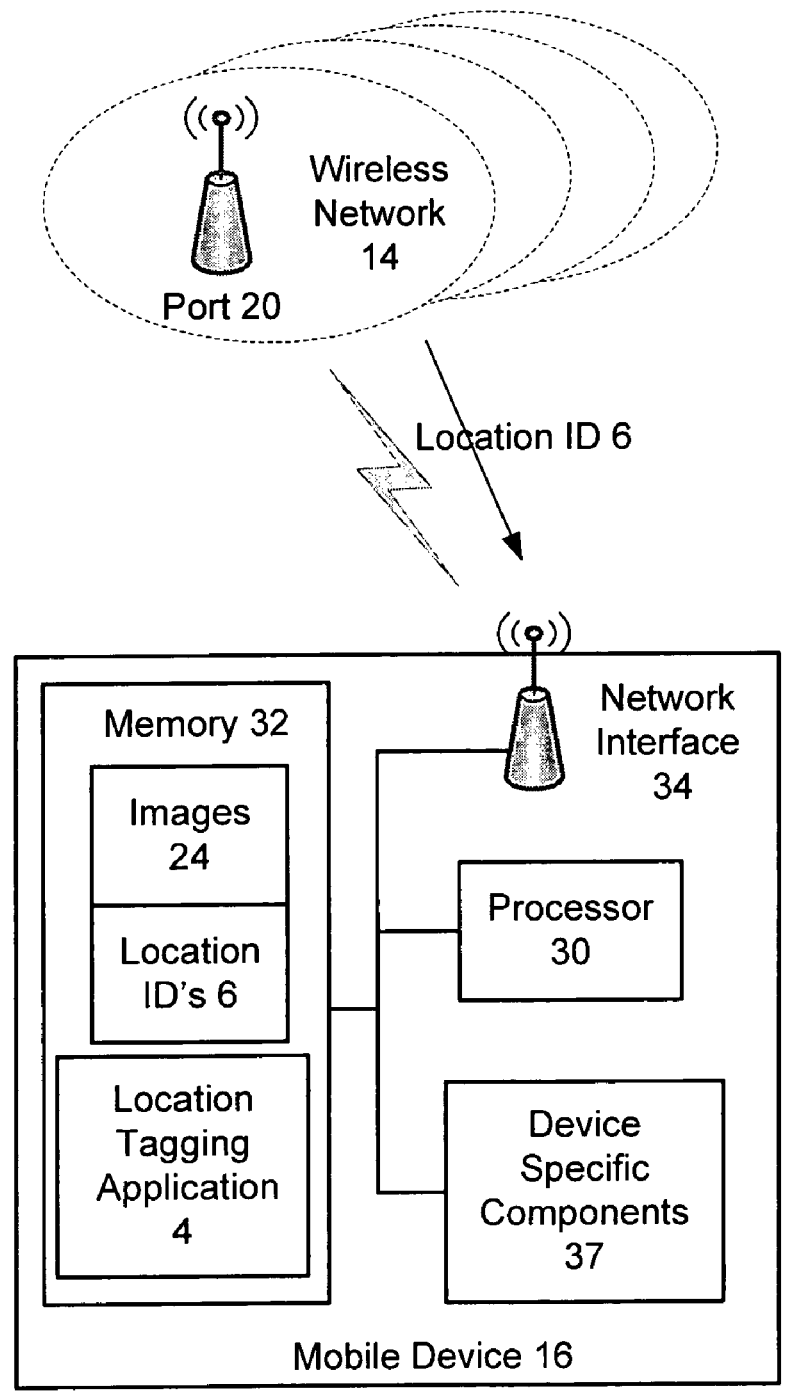
FIG. 2 is a block diagram illustrating a system for utilizing local networks to determine a location of digital images captured with a mobile device according to the first embodiment of the present invention.

FIG. 2 is a block diagram illustrating a system for utilizing local networks to determine a location of digital images captured with a mobile device according to the first embodiment of the present invention. The system includes a plurality of networks 14 and a hand-held digital image capture device, (hereinafter, mobile device) 16. Although in a preferred embodiment, the network 14 and the mobile device are wireless, as shown, a wired network and wired network connection to the device 16 may also be used to implement the present invention. The wireless networks 14 typically include one or more wireless access ports 20 depending on the geographic size of the network. The geographic boundary covered by each wireless network 14 is commonly referred to as a hot spot. Typically, anyone entering the hot spot with a compliant wireless device has connectivity to the Internet 22. In a preferred embodiment, the wireless networks 14 and the mobile device 16 comply with the IEEE standard 802 and/or BlueTooth and substitutes therefore. In an 802.11 Wi-Fi network, each access port 20 has a range of approximately 150 feet, while in an 802.16 or 802.20 WiMAX network, each access port 20 has a range measured in miles.

The mobile device 16, which may be a camera phone, PDA and the like, includes a CPU or DSP 30, a memory 32, a network interface 34, and device specific components 37, including a camera, for carrying out the intended function of the device 16.

Figure 3:
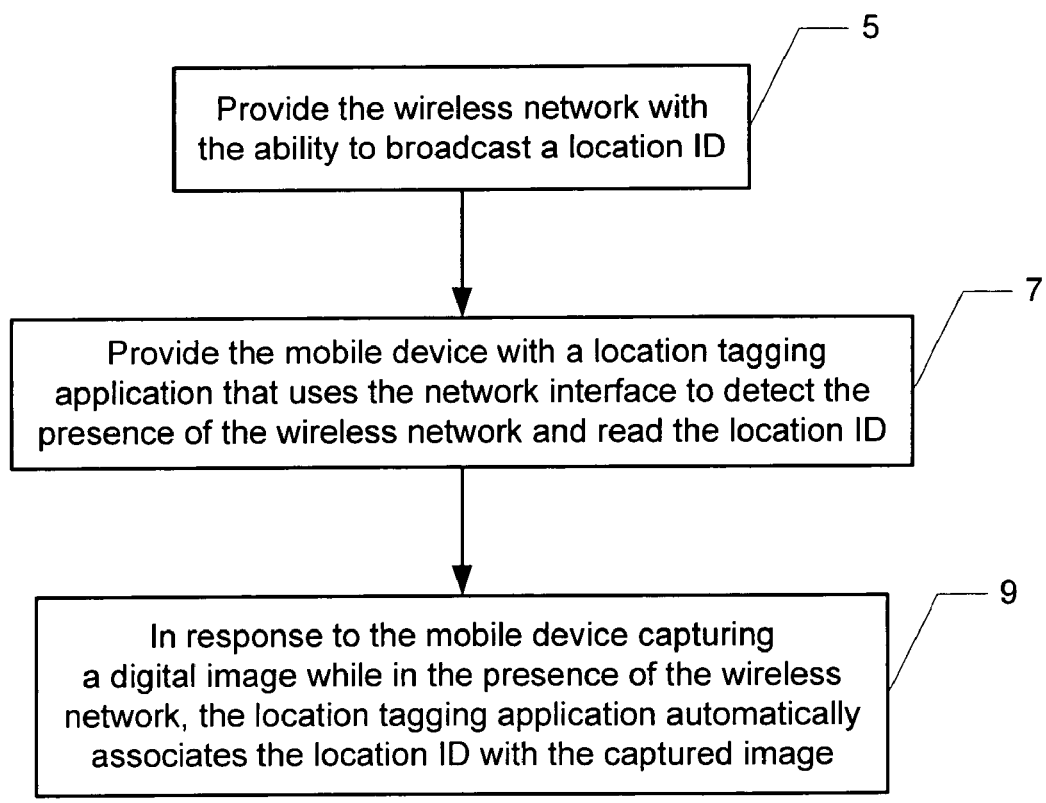
FIG. 3 is a flow diagram illustrating the process for establishing a location for a digital image based on a detected location ID according to the first embodiment of the present invention.

FIG. 3 is a flow diagram illustrating the process for establishing a location for a digital image based on a detected location ID according to the first embodiment. Referring to both FIGS. 2 and 3, the process begins by providing the wireless network 14 with the ability to broadcast an identifier of the location of the wireless network, referred to hereinafter as a location ID 6 in step 5. As stated above, the location ID 6 may comprise text, an audio clip, or both (e.g., "San Francisco international Airport"). In a preferred embodiment, the wireless network 14 broadcasts the location ID 6 as part of the wireless protocol. In an alternative embodiment, the wireless network 14 is provided with a separate device that broadcasts the location ID 6 as a message to all devices on the wireless network 14. In this environment, a separate device could be a small unit that plugs into the wall of the local establishment and is set up to have access to the local wireless network 14 for just this purpose.

In step 7, the mobile device 16 is also provided with a small custom client, referred to as a location tagging application 4 that uses the network interface 34 to detect the presence of the wireless network 14 when coupled to the network, and read the location ID broadcast from the access port 20 of the network 14. The network interface 34 at a minimum includes a wireless receiver for enabling the device 16 to detect the presence of the wireless network 14 under direction of the location tagging application 4. Preferably, full communication with the network 14 does not need to be established before the location tagging application 4 can detect the broadcast location ID. Alternatively, the network interface 34 may comprise a transceiver that provides the mobile device 16 with full wireless communication.

In step 9, in response to the mobile device 16 capturing a digital image 24 while in the presence of the wireless network 14, the location tagging application 4 automatically associates the location ID 6 with the captured image 24. According to the first embodiment of the present invention, a method and system for automatically determining the location of images captured by mobile device and for associating the location with the images using broadcast location IDs is provided that is a cost-effective alternative to the use of bulky and expensive GPS systems.

Figure 4:
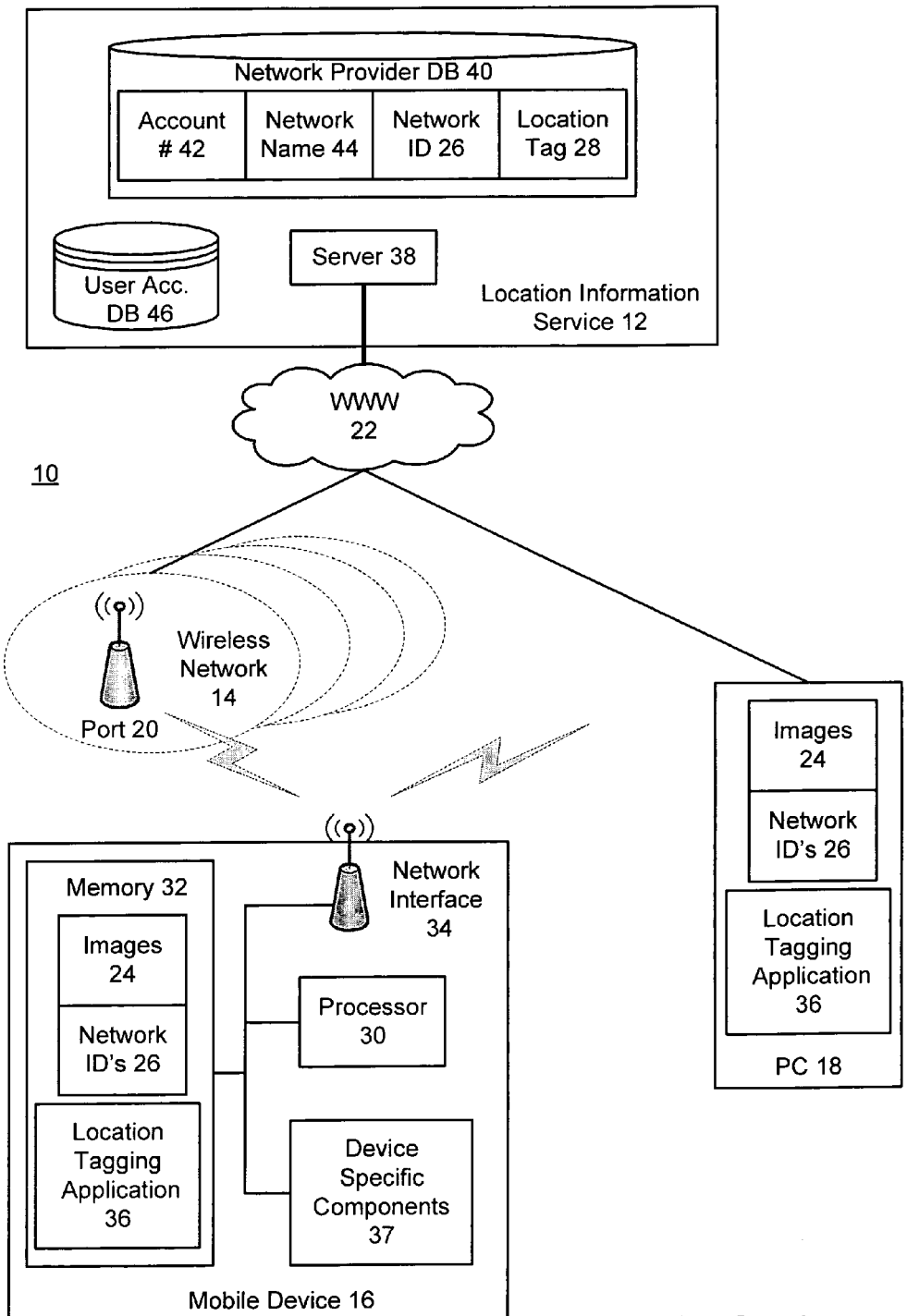
FIG. 4 is a block diagram illustrating a system for utilizing local wireless networks to determine a location of digital images captured with a wireless mobile device.

FIG. 4 is a block diagram illustrating a system for utilizing local wireless networks to determine a location of digital images captured with a wireless mobile device according to the second embodiment of the present invention. The system 10 includes a plurality of wireless networks 14, a mobile device 16, and an optional PC 18 for storing the images captured by the image capture device 14.

The second embodiment of the present invention also eliminates the need to use GPS systems for location information for images by providing either the mobile device 16 and/or the PC 18 with a location tagging application 36 that may perform the same functions described above for the tagging application 4, but also communicates with a network-based location information service 12 over the Internet 22. After the mobile device 16 captures digital images 24 while in the presence of the wireless network 14, the user of the mobile device 16 utilizes the location information service 12 to have the captured images 24 automatically tagged with a predefined location tag 28 associated with the detected network ID 26.

Figure 5:
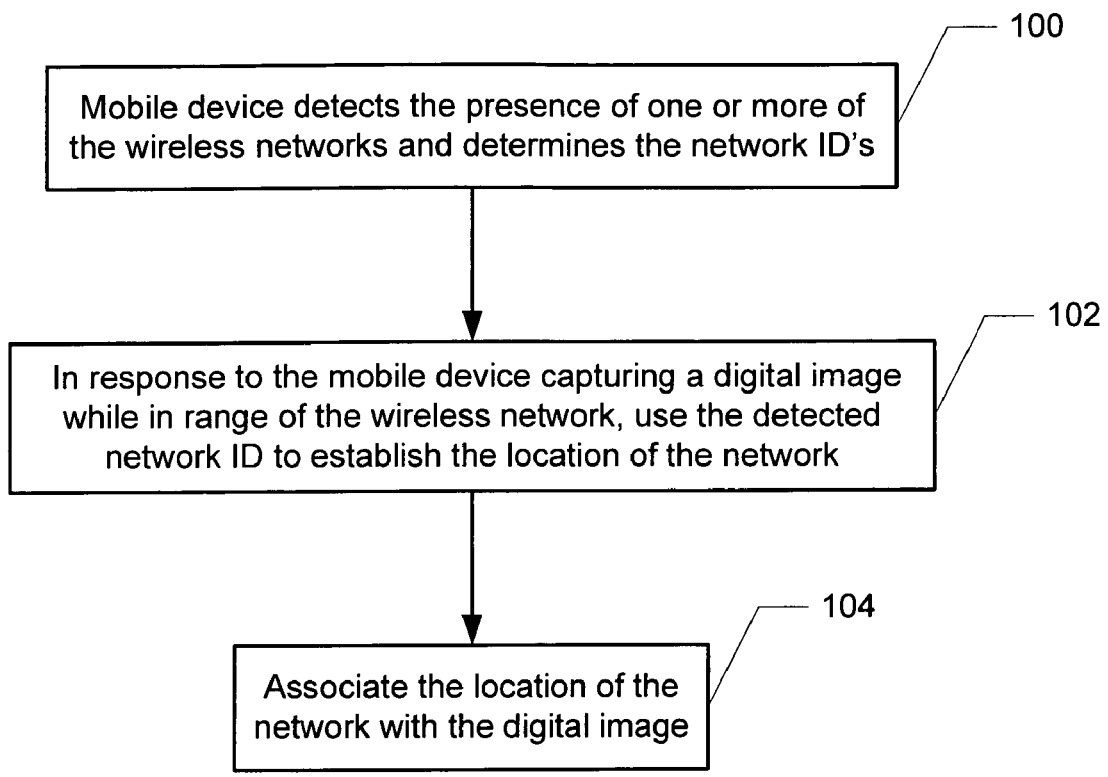
FIG. 5 is a flow diagram illustrating the process for establishing a location for a digital image based on a detected network ID in a preferred embodiment of the present invention.

FIG. 5 is a flow diagram illustrating the process for establishing a location for a digital image based on a detected network ID in a preferred embodiment of the present invention. Referring to both FIGS. 4 and 5, the process begins in step 100 when the mobile device 16 detects the presence of one or more of the wireless networks 14 and determines an identifier (ID) of the networks 14. The network interface 34 at a minimum includes a wireless receiver for enabling the device 16 to detect the presence of the wireless network 14 under direction of the location tagging application 36. Alternatively, the network interface 34 may comprise a transceiver that provides the mobile device 16 with full wireless communication. The identifier of the network or network ID 26 detected by the mobile device 16 may be a network address and/or an ID of the nearest access port 20 in a multi-port network 14.

In step 102, in response to the mobile device 16 capturing a digital image 24 while in range of the wireless network 14, the detected network ID 26 is used to establish the location of the network. This is accomplished by sending the network ID 26 to a server 38 of the location information service 12 for retrieval of the location tag 28 corresponding to the submitted network ID 26. In response to receiving the network ID 26, in step 104 the server 38 returns the location tag 28 corresponding to the network ID 26 so that the location of the network can then be associated with the digital image 14.

Figure 6:
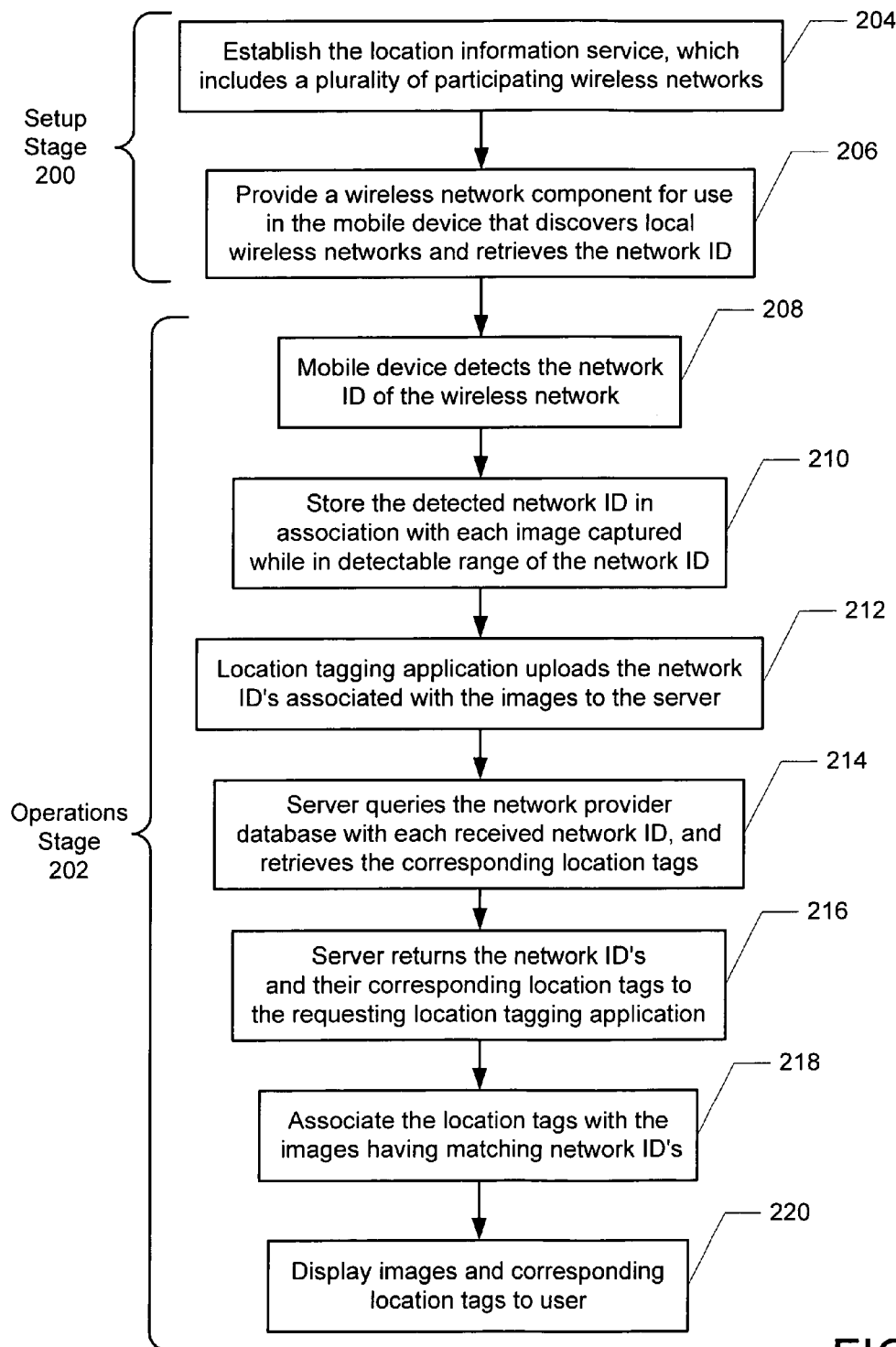
FIG. 6 is a flow diagram illustrating the process for establishing the location for digital images based on a detected network ID in further detail according to a first embodiment of the present invention.

FIG. 6 is a flow diagram illustrating the process for establishing the location for digital images based on a detected network ID in further detail. According to a first embodiment of the present invention, the process includes two stages: a location information service setup stage 200 and an operations stage 202.

The setup stage 200 begins in step 204 by establishing the location information service 12 that includes a plurality of participating wireless networks 14 that broadcast network ID's 26 in a manner that enables the networks 14 and/or their access ports 20 to be identified through their wireless protocol, and that make their network ID's 26 available to the location information service 12. According to the present invention, each network 14 owner provides to the location information service 12 its network ID 26 and a location tag 28 describing the location of the network 14. The network ID 26 and the location tag 28 are stored in a network provider database 40 along with other information regarding each wireless network 14, including an account number 42, and a name of the network provider 44. In a preferred embodiment of the present invention, the location information service 12 agrees to pay the owner of each participating wireless network 14 a fee to become part of the location information service 12. The fee may be a one time lump sum or an incremental fee based on the number of location tag requests for the network 14 that the location service 12 receives over some period of time, or a combination of these two payment methods.

The setup stage 200 also includes providing a wireless network component for use in the mobile device 16 in step 206, preferably the location tagging application 36 that discovers local wireless networks 14 and communicates with them sufficiently through the network interface 34 to retrieve the network ID 26. As described above, retrieving the network ID 26 may not require any transmission on the part of the mobile device 16 if the network ID 26 is transmitted as part of the network's normal wireless protocol. In an alternate embodiment, a wireless device could be provided either as part of a wireless network 14 or as a stand-alone device whose sole purpose is to transmit such information to the wireless device 16.

Prior to accessing the location information service 12 with the mobile devices 16, end-users of the mobile devices 16 must first signup with the location information service 12, preferably for a fee. For example, the location information service 12 may charge users a one cent fee for each network ID upload. Once a user is signed up, an account is created for the user and stored in a user account database 46.

The operations stage 202 begins in step 208 when the mobile device 16 of a location service registered user detects the network ID 26 of the wireless network 14. In step 210, the mobile device 16 stores the detected network ID 26 in association with each image 24 captured while the mobile device 16 is in detectable range of the network ID 26. In step 212, the location tagging application 36 uploads the network ID's 26 associated with the captured images 24 to the server 38 for the purpose of receiving in response the location tag 28 describing where the images were taken. Note, if several images were taken within the same wireless network 14, then the location tagging application 36 need only transmit a single detected network ID 26. If different images 24 were taken within different wireless networks 14, then the network ID for each detected wireless network 14 would be sent to the server 38.

In a preferred embodiment, the network ID's 26 are sent to the server 38 from the location tagging application 36 running on the user's PC 18 after the images 24 and their network ID's 26 are transferred to the PC 18. Alternatively, the location tagging application 36 on the mobile device 16 may be used to transfer the network ID's 26 directly to the server 38.

In step 214, after receiving the network ID's 26, the server 38 queries the network provider database 40 with each received network ID 26, and retrieves the corresponding location tags 28. In step 216, the server 38 returns the network ID's 26 and their corresponding location tags 28 to the requesting location tagging application 36. In step 218, the location tagging application 36 associates the location tags 26 with the images 24 having matching network ID's 26. Preferably, location tags 26 are stored as part of the image's metadata. In step 220, when the images 24 are subsequently displayed to the user, the location tagging application 36 also displays the corresponding location tags 28, thereby automatically indicating the general capture location of the picture.

In a third embodiment of the present invention, not only does the location information service 12 provide the user with the general capture location tag for each image 24, but also provides a specific description tag that describes the content of the image 24.

Figure 7:
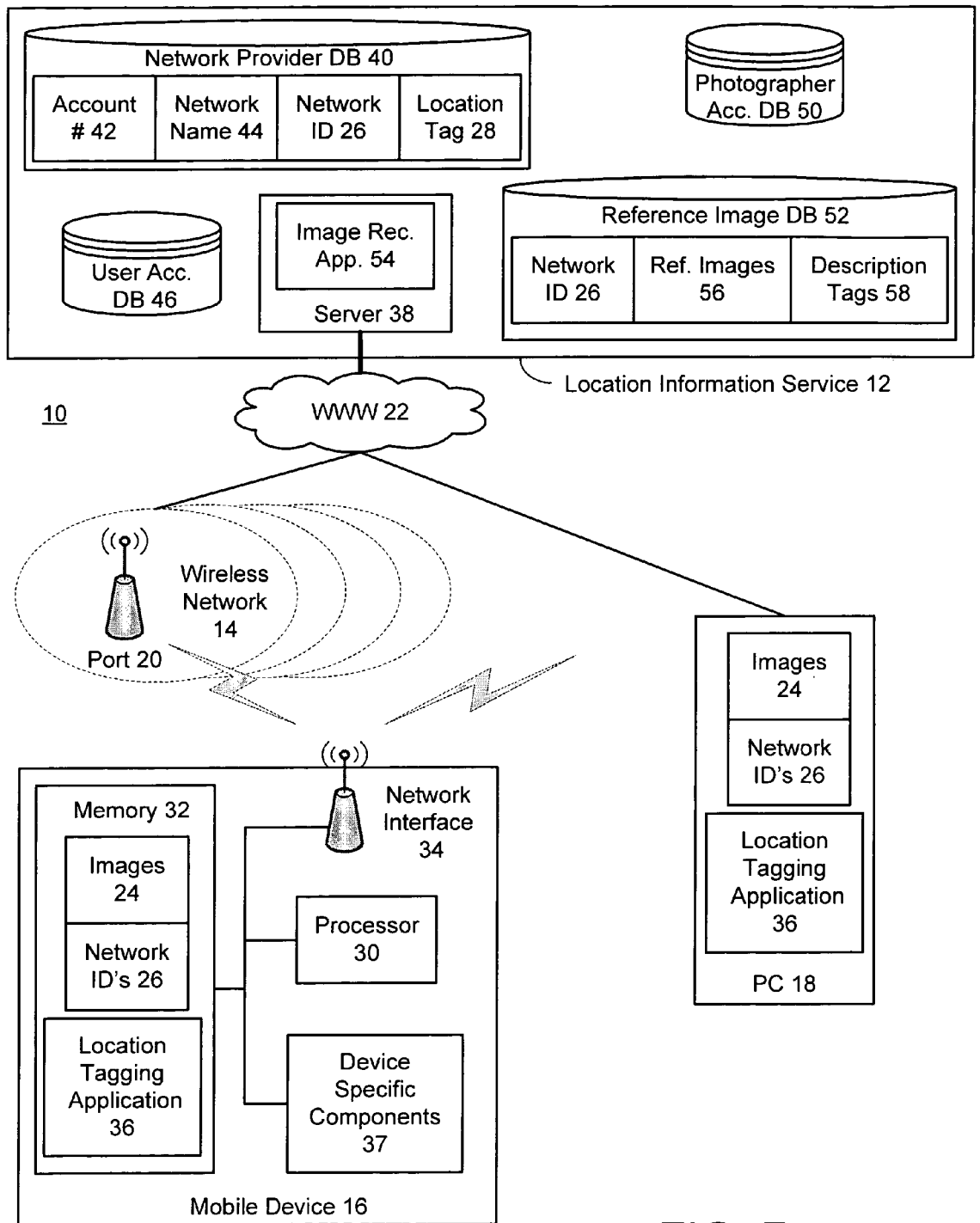
FIG. 7 is a block diagram illustrating a system for providing specific description tags describing the content of digital images.

FIG. 7 is a block diagram illustrating a system for providing specific description tags describing the content of digital images, where like components from FIG. 4 have like reference numerals. To implement the third embodiment of the present invention, the location information service 12 is provided with a photographer account database 50, a reference image database 52, and an image recognition application 54.

Figure 8A:
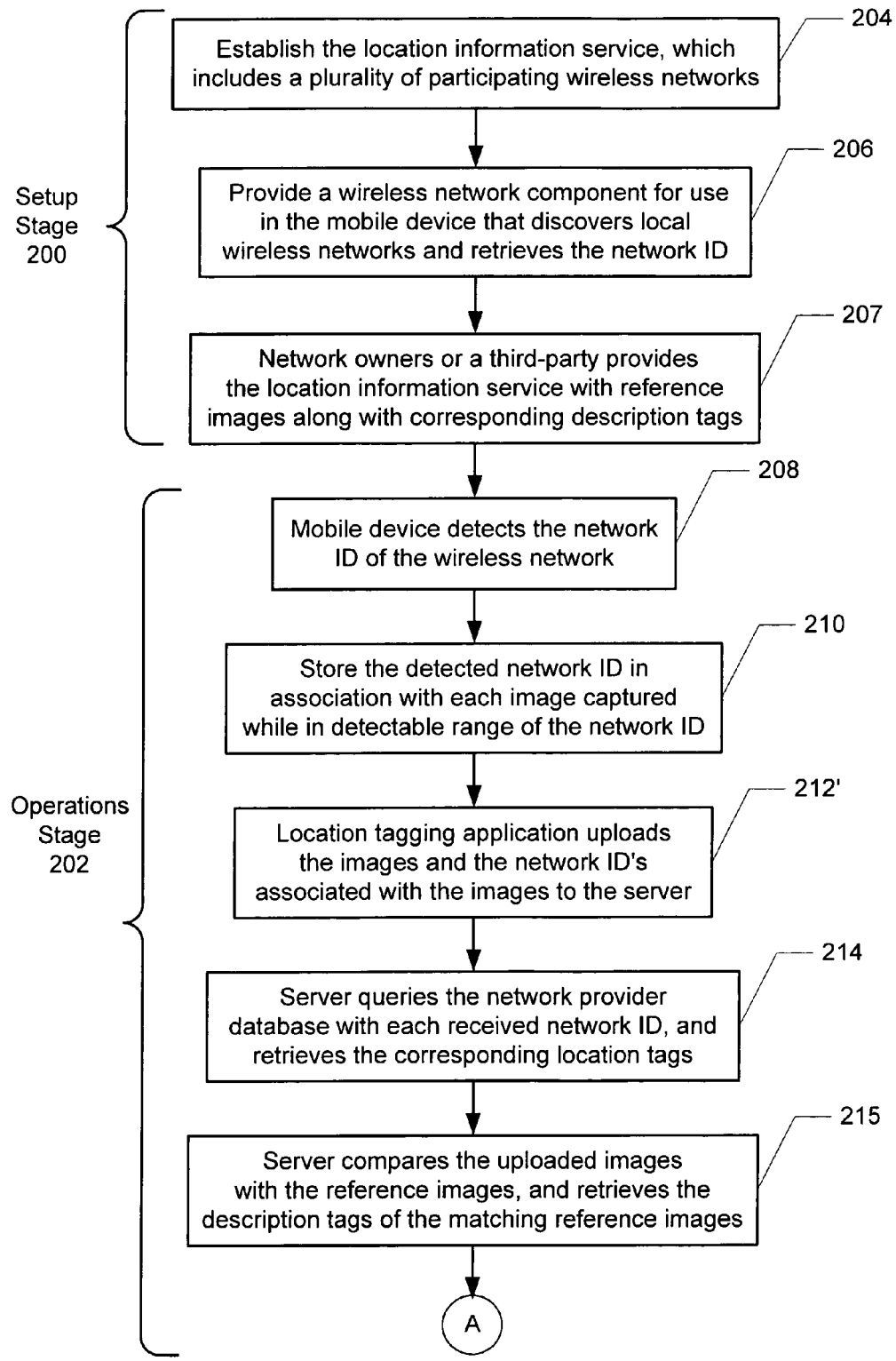
FIGS. 8A-8B are flow diagrams illustrating the process of automatically tagging images with location information that includes a description of the image in accordance with a preferred embodiment.
Figure 8B:
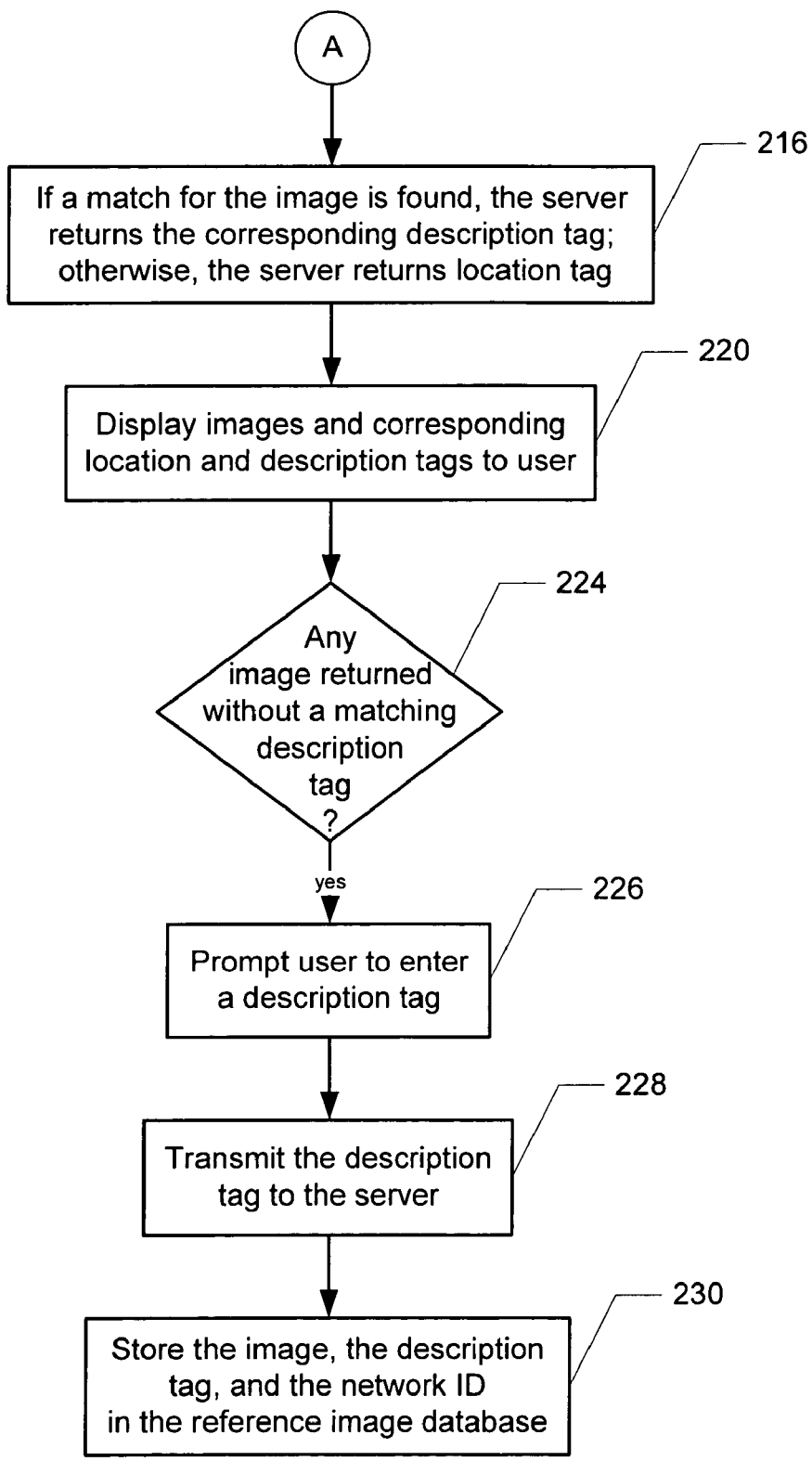

FIGS. 8A-8B are flow diagrams illustrating the process of automatically tagging images with location information that includes a description of the image in accordance with a preferred embodiment. The process is similar to that described with respect to FIG. 6 with additional steps. Therefore, FIGS. 8A-8B reproduce the steps from FIG. 6 along with modified and additional steps corresponding to the second embodiment of the present invention.

Referring to both FIGS. 7 and 8A, the first modification begins with new step 207 where each network owner or a third-party photographer provides the location information service 12 with reference images 56 of items of interest within, and in view of, the wireless network 14 along with corresponding description tags 58 indicating the content of the reference image 56. As an example, the description tags 58 may identify landmarks, streets, buildings, and so on. The reference images 56 and the corresponding description tags 58 are stored in the reference image database 52. In a further aspect of this embodiment, the location information service 12 pays a fee for any reference images 56 submitted. In the case where the network owner submits the reference images 56, the transaction is stored in the network provider database 40 under the account number of the network 14. In the case of a third party supplying the reference images 56, the transaction is stored in a photographer account database 50. In the case where reference images 56 are provided by the user of the mobile device 16, the transaction is stored in the user account database 46. Registered users may be paid in the form of free tagging services, rather than money.

The beginning of the operations stage 202 remains the same in which the network ID 26 is detected and stored with each image captured within the wireless network 14 in steps 208 and 210. In step 212' the location tagging application uploads both the images 24 and the network ID's 26 associated with the images to the server 38. As an alternative to sending full resolution images, the location tagging application 36 may upload reduced resolution images to the service 12.

In step 214, after receiving the network ID's 26, the server 38 queries the network provider database 40 with each received network ID 26, and retrieves the corresponding location tags 28. In step 215, the server 38 invokes the image recognition application 54 to compare the uploaded images 24 with relevant reference images 56 associated with the same network ID 26 as the uploaded images 24, and retrieves the description tags 58 of the matching reference images 56. Various types of image recognition programs are well-known to those with ordinary skill in the art and therefore will not be described further.

Referring to FIG. 8B, in step 216, if a match for the image 24 is found, then the server 38 returns the corresponding description tag 58 to the requesting location tagging application 36; otherwise, the server 38 returns the corresponding general location tag 28. Whichever tag is returned, the description tags 58 and/or the location tag 28, the tag is preferably stored as part of the image's metadata. The description tag 58 may contain the same information contained in general location tag 28 plus specific information about the content of the image. In step 220, when the images 24 are subsequently displayed to the user, the tags 58 or 28 are returned in association with each image 24 are also displayed, thereby automatically indicating the specific content of the image, or otherwise the general capture location of the image. In an alternative embodiment, both tags 58 and 28 for an image may be returned and displayed.

In step 224, the location tagging application 36 determines if there are any images 24 returned from the server 38 without a matching description tag 58. If so, then the location tagging application 36 prompts the user to enter a description in step 226. If the user complies, the location tagging application 36 transmits the description tag to the server 228 (with user permission). In step 230, the server 38 stores the image 24 as a reference image 56 in the reference image database 52 along with the uploaded description tag 58 and the corresponding network ID, thereby helping to populate the reference image database to increase the probability of future image recognition matches.

Notice that the location information service 12 need not be concerned with tampering in the form of falsely submitted images or tags because of built-in security and feedback mechanisms associated in the service 12. There are two types of possible tampering: one is the submission of reference images 56 having intentionally wrong network ID's, and the second is the submission of images 56 having intentionally bogus description tags 58. The first type of tampering can be taken care of by ensuring that the network ID's 26 transmitted to the service 12 in association with the images 24 are securely embedded within the images 24 so that one intent on tampering could not simply copy the network ID from one image into another. However, even if one could upload a reference image 56 associated with the wrong network ID to the service 12, no harm would be done because an image 24 uploaded to service 12 for recognition would not likely match the false image. Over time, any reference image 56 that produces no matches in the database 52 could be deleted. The second type of tampering where an image is submitted with a bogus description type 58 may result in an image 24 submitted by a user being returned with the bogus description tag 58. In this instance, the user would presumably report the incorrect description tag 58 to the location information service 12, which may then either delete that entry in the database 52 or correct it. This could be done automatically if the user replaces the description in the tag with a different description. In this case, the tagging application could ask the user if the new description was better than the old, or if the old was in fact incorrect.

A method and system for establishing a location for a digital image has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

We claim:

1. A system for providing location information for digital images using one or more wireless networks that broadcast network IDs that are detectable through a wireless protocol, the system having a network-based service that maintains a database of the wireless networks, the network IDs, a location tag of each wireless network describing a location of the corresponding wireless network, and a plurality of reference images of items in view of one or more wireless networks, and for each reference image: storing the reference image in association with a corresponding network ID of a wireless network from the one or more wireless networks in which the reference image is in view of and a description tag indicating the content of the image, the system comprising:

a mobile device configured to detect the wireless networks and the network IDs, the mobile device further configured to capture digital images and to associate the captured images with a network ID detected at the time of image capture;

means for transmitting the captured images and the network IDs associated with each of the captured images to the network-based service for retrieval of the corresponding location tags for the captured images each location tag describing the location without using global positioning system coordinates; and for each uploaded digital image:

means for receiving a corresponding description tag of a matching reference image from the network-based service if the server finds a matching reference image among reference images associated with a same network ID as the network ID;

means for receiving the retrieved location tags from the network-based service and for associating the location tags with the captured images if the server does not find a matching reference image; and means for displaying the captured images and for each captured image: one of a corresponding location tag and a corresponding description tag;

wherein at least one of the means includes at least one electronic hardware component.

2. The system of claim 1 wherein the means for transmitting the network IDS associated with each of the captured images and the means for receiving the retrieved location tags are provided in a location tagging application.

3. A system for providing location information for digital images using one or more wireless networks that broadcast network IDs that are detectable through a wireless protocol, the digital images captured by a mobile device configured to detect the wireless networks and the network IDs and to associate the captured images with a network ID detected at the time of image capture, the system comprising system components including:

a network-based service that maintains a database of reference images in view of one or more wireless networks, for each reference image: a network ID of a wireless network from the one or more wireless networks associated with the reference image in which the reference image is in view of when the reference image was captured, and a description tag describing contents of each respective reference image and receives images captured by the mobile device and the associated network ID for the images; and, an image recognition application accessible to the network-based service for comparing uploaded images captured by the mobile device with relevant reference images associated with a same network ID as the uploaded images, and retrieving the description tags of any matching reference images, wherein for each image, if a matching reference image is found, the network-based service returns the corresponding description tag to a requesting application, thereby automatically indicating a specific content of the image, else if a matching reference image is not found, returning a corresponding location tag, thereby automatically indicating a general capture location of the image, and wherein each network ID does not utilize global positioning system coordinates, wherein at least one of the system components includes at least one electronic hardware component.

4. The system of claim 3 wherein the requesting application comprises a location tagging application, the location tagging application transmitting the images captured by the mobile device and the network ID associated with each of the captured images to the network-based service for retrieval of corresponding location tags from the network-based service.

5. A method for establishing a location for a digital image, comprising:

providing a network-based location information service with a plurality of reference images of items in view of one or more wireless networks, and for each reference image: storing the reference image in association with a corresponding network ID of a wireless network from the one or more wireless networks in which the reference image is in view of and a description tag indicating the content of the image;

detecting, by a digital image capture device coupled to one of the one or more wireless networks, a location identifier (ID) broadcast over the one of the one or more wireless networks, the location ID identifying a location of the one of the one or more wireless networks network and comprising a network ID identifying at least a portion of the network;

in response to the digital image capture device capturing a digital image when in communication with the one of the one or more wireless networks:

associating the location ID with the digital image, wherein the location ID identifies the location of the one of the one or more wireless networks without using global positioning system coordinates;

uploading the digital images and the network ID of the at least one wireless network from the digital image capture device to the network-based location information service;

for each uploaded digital image: if the server finds a matching reference image among reference images associated with a same network ID as the network ID:

receiving a corresponding description tag of a matching reference image from the server, thereby automatically indicating a specific content of the digital image;

associating the corresponding description tag with the digital image;

else:

receiving a corresponding location tag, thereby automatically indicating a general capture location of the digital image; and associating the corresponding location tag with the digital image, the corresponding location tag including a text description of the location of the network portion.

6. The method of claim 5 wherein the location ID is provided as a text tag, an audio tag, or a text and audio tag.

7. The method of claim 6 further comprising: providing the digital image capture device with a location tagging application for detecting the location ID and for associating the location ID with the captured image.

8. The method of claim 7 wherein the network is wireless and the digital image capture device comprises a wireless mobile device.

9. The method of claim 5 further including:

displaying the digital image and the corresponding location tag, thereby automatically indicating a general capture location of the digital image.

10. The method of claim 5 further including:

uploading the network ID to the location information service from a location tagging application.

11. The method of claim 10 further including: running the location tagging application on the mobile device.

12. The method of claim 10 further including: running the location tagging application on a PC and downloading the digital image and the detected network ID to the PC prior to transmitting the network ID to the location information service.

13. The method of claim 10 further including: receiving a corresponding location tag in response to sending a server of the location information service the network ID from the location tagging application.

14. The method of claim 13 further including: in response to receiving the location tag from the location information service, the location tagging application stores the location tag as image metadata.

15. The method of claim 5 further including:
paying a fee for any reference images submitted to the location information service.

16. A computer-readable medium containing program instructions for establishing a location for a digital image, the program instructions for:
providing a network-based location information service with a plurality of reference images of items in view of one or more wireless networks, and for each reference image: storing the reference image in association with a corresponding network ID of a wireless network from the one or more wireless networks in which the reference image is in view of and a description tag indicating the content of the image;
detecting, by a digital image capture device coupled to one of the one or more wireless networks, a location identifier (ID) broadcast over the one of the one or more wireless networks, the location ID identifying a location of the one of the one or more wireless networks network and comprising a network ID identifying at least a portion of the network;
in response to the digital image capture device capturing a digital image when in communication with the one of the one or more wireless networks:
associating the location ID with the digital image, wherein the location ID identifies the location of the one of the one or more wireless networks without using global positioning system coordinates;
uploading the digital images and the network ID of the at least one wireless network from the digital image capture device to the network-based location information service;
for each uploaded digital image: if the server finds a matching reference image among reference images associated with a same network ID as the network ID:
receiving a corresponding description tag of a matching reference image from the server, thereby automatically indicating a specific content of the digital image;
else:
receiving a corresponding location tag, thereby automatically indicating a general capture location of the digital image; and
associating the corresponding location tag with the digital image, the corresponding location tag including a text description of the location of the network portion.

17. The computer-readable medium of claim 16 wherein the location ID is provided as a text tag, an audio tag, or a text and audio tag.

18. The computer-readable medium of claim 17 further comprising: providing the digital image capture device with a location tagging application for detecting the location ID and for associating the location ID with the captured image.

19. The computer-readable medium of claim 18 wherein the network is wireless and the digital image capture device comprises a wireless mobile device.

20. The computer-readable medium of claim 16, wherein the location ID comprises a network identifier (ID) identifying at least a portion of the network, the method further comprising:
utilizing the network ID to establish a location of the network portion.

21. The computer-readable medium of claim 16, further including instructions for: displaying the digital image and the corresponding location tag, thereby automatically indicating a general capture location of the digital image.

22. The computer-readable medium of claim 16 further including instructions for: running the location tagging application on the mobile device.

23. The computer-readable medium of claim 16 further including instructions for: running the location tagging application on a PC and downloading the digital image and the detected network ID to the PC prior to transmitting the network ID to the location information service.

24. The computer-readable medium of claim 16 further including instructions for: receiving a corresponding location tag in response to sending a server of the location information service the network ID from the location tagging application.

25. The computer-readable medium of claim 24 further including instructions for: in response to receiving the location tag from the location information service, the location tagging application stores the location tag the image metadata.

26. The computer-readable medium of claim 16 further including instructions for: paying a fee for any reference images submitted to the location information service.

* * * * *